United States Patent [19]
French

[11] Patent Number: 5,885,383
[45] Date of Patent: Mar. 23, 1999

[54] RESERVE OR BACK UP TIRE INSIDE A TUBELESS TIRE FOR AUTOMOBILE OR OTHER VEHICLES

[76] Inventor: Stephen J. French, 6420 W. North La., Glendale, Ariz. 85302

[21] Appl. No.: 907,991

[22] Filed: Aug. 11, 1997

[51] Int. Cl.⁶ .............................. B60C 17/06; B60C 17/04
[52] U.S. Cl. ............................................ 152/158; 152/520
[58] Field of Search .................................... 152/158, 520

[56] References Cited

U.S. PATENT DOCUMENTS

| | | | |
|---|---|---|---|
| 3,426,821 | 2/1969 | Boileau | 152/158 X |
| 4,305,444 | 12/1981 | Suris | 152/158 |
| 4,922,981 | 5/1990 | Pompier | 152/158 |
| 5,186,774 | 2/1993 | Ueyoko et al. | |
| 5,450,887 | 9/1995 | Habay et al. | |

*Primary Examiner*—Adrienne C. Johnstone
*Attorney, Agent, or Firm*—Warren F. B. Lindsley

[57] ABSTRACT

A back up tire or safety rim is formed of semi-elastic material mounted on the rim of a vehicle wheel inside a tubeless tire of the vehicle which serves as a cushion between the rim of the wheel and the tread of the tubeless tire when a blowout of the tire occurs.

4 Claims, 2 Drawing Sheets

RESERVE OR BACK UP TIRE INSIDE A TUBELESS TIRE FOR AUTOMOBILE OR OTHER VEHICLES

BACKGROUND OF THE INVENTION

Depending upon prevailing circumstances, the consequences of a flat tire or a blowout may range from a serious accident to a costly inconvenience. If a blowout occurs on a busy highway the driver may lose control of the vehicle and thereby cause an accident. If an accident is avoided, the vehicle will have to be driven to the side of the road or the driver may need to exit the freeway before the tire can be replaced. A flat tire might also occur in a dangerous area of the city or after dark where the driver deems it imprudent to stop and change the tire or the driver may not be capable of changing the tire. In such cases, the vehicle is again driven to a different location before the tire is changed. If the tire remains on the wheel after going flat, it may sustain irreparable damage; if the tire has partially or entirely left the wheel, the rim of the wheel may be damaged and the wheel will need to be replaced.

Because of such potentially serious consequences and in light of the frequency of the less serious costs resulting from such occurrences, there is a need for a device that can be incorporated in the wheel or tire of an automobile or other vehicle which will render the vehicle less susceptible to loss of control in the event of a blowout, will provide protection against further damage to the tire or the wheel when the vehicle is driven to the side of the road for repairs.

DESCRIPTION OF THE PRIOR ART

Various devices are described in the prior art for installation inside an inflatable tire as a means for improving the performance or operability of a flat or partially deflated tire. The devices described in the following two patents are characteristic.

U.S. Pat. No. 5,186,771 describes a ring device for running with a flat tire and having articulated sectors for a vehicle wheel equipped with a tubeless tire mounted on a one-piece rim. The device comprises three sectors that are bolted together to form an annular support for the tread of the deflated tire.

U.S. Pat. No. 5,450,887 describes a relatively complex and expensive device for installation inside a tubeless tire for use in the event of the travel of the tire under an inflation pressure of zero or low value. This device is intended for use primarily with truck tires or other vehicles carrying heavy loads.

While such devices might be found functionally adequate in their intended applications, a simpler and less expensive device is required if it is to be accepted commercially for use in passenger cars.

SUMMARY OF THE INVENTION

In accordance with the invention claimed, an improved means is provided for reducing the hazards and costs associated with flat tires and blowouts, the means comprises a reserve or back up tire in the form of an annular band placed inside the tubeless tire of an automobile and carried within the central impression of the wheel rim.

It is, therefore, one object of the present invention to provide an improved means for reducing the safety hazards and costs associated with blowouts and flat tires of automobiles and other vehicles.

Another object of the invention is to provide such a means which will reduce the likelihood that a driver will lose control of a vehicle in the event of a blowout.

A further object of the invention is to provide such a means which will reduce the damage inflicted upon a tire when the automobile is driven after a tire has lost pressure or gone flat.

A still further object of the invention is to provide such a means which will prevent damage to the rim of a wheel when the automobile is driven after the wheel has lost a tire as the result of a blowout.

Yet another object of the invention is to provide such a means in a very simple form that will be found reliable as well as inexpensive and therefore readily acceptable as a commercial product.

DESCRIPTION OF THE PREFERRED EMBODIMENT

Figure 1:
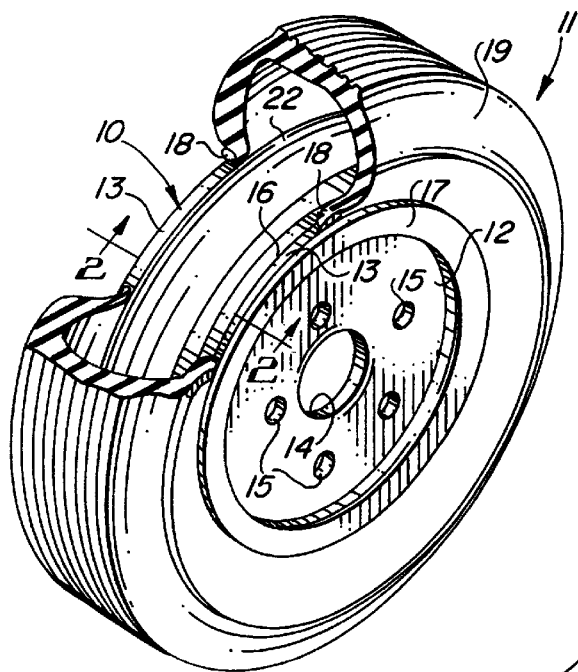
FIG. 1 is a perspective view partially broken away of a tire mounted on the rim of a vehicle wheel and embodying the invention.

Referring more particularly to the drawing by characters of reference, FIGS. 1–5 disclose in a first embodiment a back up tire or safety rim 10 of the invention as installed on a wheel 11.

Wheel 11 comprises a conventional circular disc or plate portion 12 and a rim portion 13.

The disc portion 12 has a central opening 14 for the hub of the axle and it has a number of lug bolt holes 15 for use in mounting wheel 11 to the axle and brake drum assembly.

Rim 13 is in the form of a short cylinder or ring with a flat-bottomed annular depression 16 at its center. The inside cylindrical surface of rim 13 in the region of depression 16 perpendicularly abuts the periphery of disc portion 12 where it is attached by riveting, welding, heating or other suitable attachment means. The outer edges of rim 13 are flared to form a cross-section that curves radially outward to form an annular surface 17 for holding the beaded edge 18 of tire 19 in a mating relationship that is rendered increasingly secure by air pressure inside the tire so that a sealing action occurs as the tire is inflated and an airtight junction is thereby realized between the beaded edge 18 of the tire and annular surface 17 of the rim.

As shown in FIGS. 1–5, the reserve or back up tire 10 comprises an annular ring or band with a cylindrical inside surface 21 that is bonded to the depression 16 of rim 13. The radially outer face 22 of back up tire 10 is rounded or semicircular as seen in the cross-sectional view of FIG. 2, this particular shape being particularly desirable as a bearing surface for travel upon a roadway and also because it affords a relatively high outer diameter of the back up tire 10 while still permitting assembly of the conventional tire 19 over rim 13 and back up tire 10.

Figure 2:
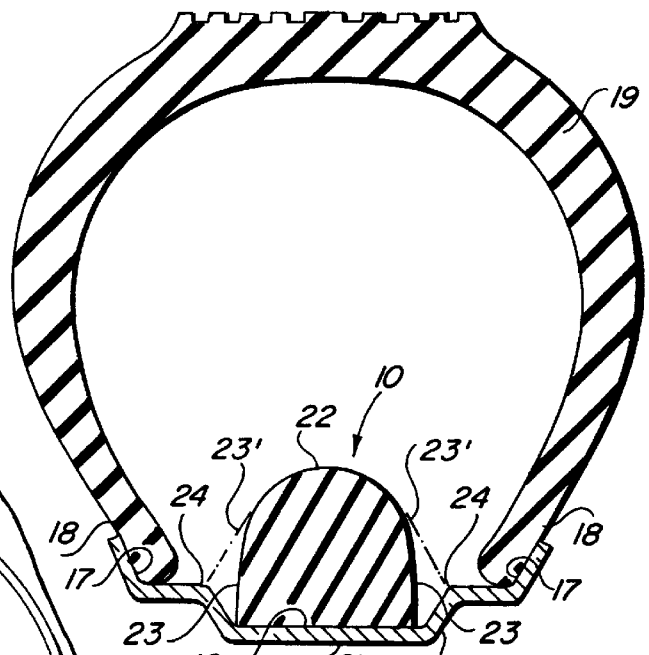
FIG. 2 is a cross sectional view of FIG. 1 taken along the line 2—2.

As shown in FIG. 2 and as described earlier, the side faces 23 of the back up tire 10 may extend vertically and tangentially from the edges of the semicircular outer face 22 to the outer bottom edges of the depression 16 of rim 13. Alternatively, they may slope outwardly to the brinks 24 of the depressed portion of rim 13 as shown in FIG. 2 by the broken lines 23'. The latter contours provide a more solid and secure mounting of the back up tire 10 to rim 13.

The back up tire 10 is preferably made of vulcanized rubber that is molded and vulcanized in place upon rim 13. Other materials such as synthetic rubber or plastic may also be found to serve satisfactorily. Any of these materials may be reinforced with cording or wire to insure a robust tire with adequate strength for this application.

Figure 3:
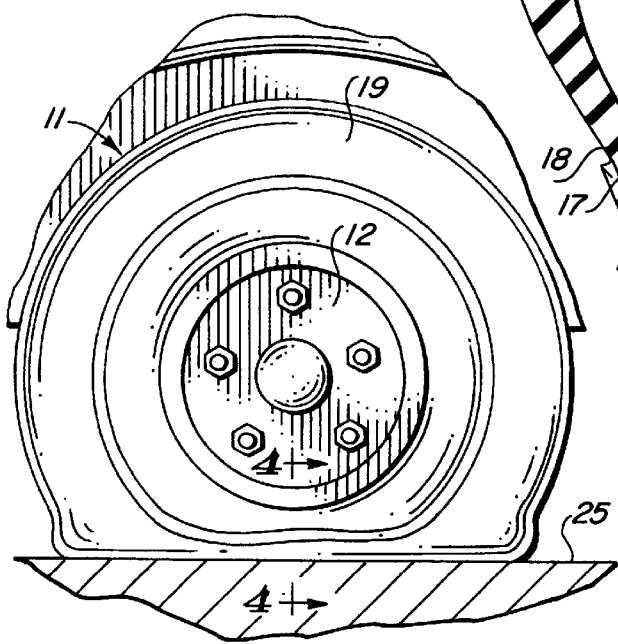
FIG. 3 illustrates the wheel of FIG. 1 with a deflated tire.
Figure 4:
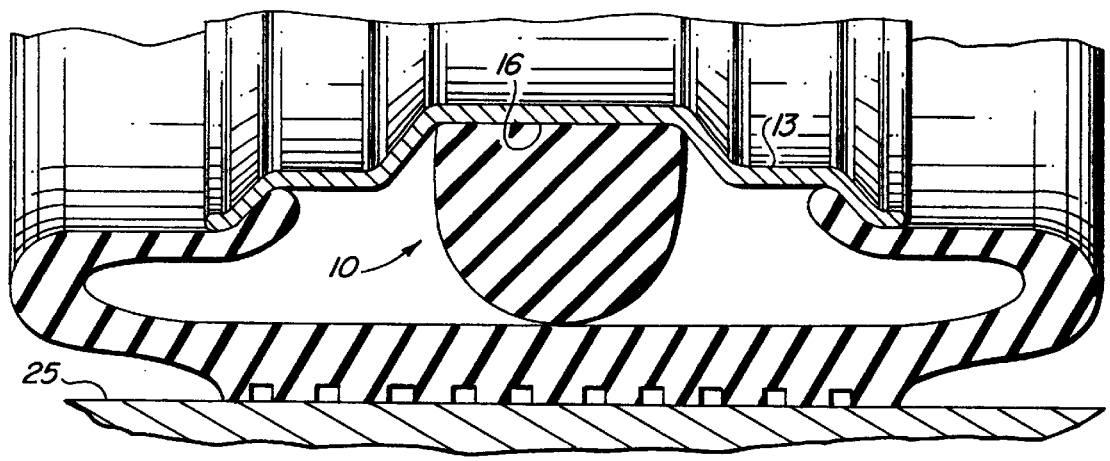
FIG. 4 is a cross sectional view of FIG. 3 taken along the line 4—4.

FIGS. 3 and 4 show a deflated tire 19 in operation upon a roadway 25. As shown in FIG. 4, the back up tire 10 of the invention serves as a cushion between rim 13 of wheel 11 and tire 19 as it bears against the inside surface of tire 19, thereby limiting the degree of bulging and bending of the sidewalls of tire 19 which would otherwise bear the full weight of the load carried by wheel 11.

Figure 5:
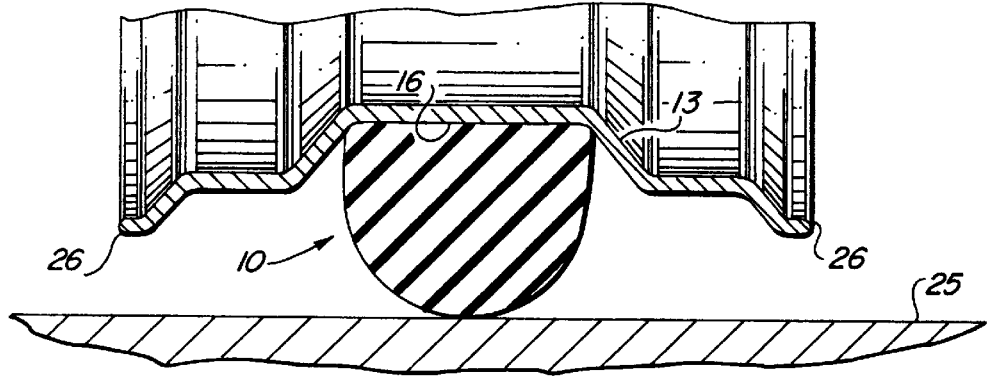
FIG. 5 illustrates the back up tire of FIGS. 1–4 following a blowout with the resulting disintegration of the tire.

FIG. 5 illustrates the back up tire 10 of the invention in service upon a roadway 25 following a blowout and the resulting disintegration of tire 19. In this case, the back up tire rides directly upon roadway 25 preventing contact of edges 26 of rim 13 with the roadway surface and thereby effectively preventing damage to rims 13.

Figure 6:
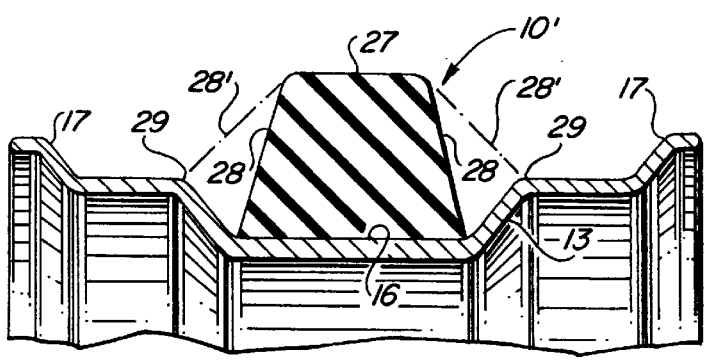
FIG. 6 is a modification of the invention shown in FIGS. 1–5 illustrating a variation of the back up tire.

FIG. 6 shows a variation of the invention in which the cross-sectional shape of the back up tire 10' has a cylindrical bearing surface 27 (flat in cross-section) and sides 28, 28' that slope or taper outwardly to the outer edges of the depression 16 or to the brinks 29.

An improved reserve or back up tire is thus provided for reducing the hazards and costs associated with flat tires and blowouts in accordance with the stated objects of the invention, and although but a few embodiments of the invention have been illustrated and described, it will be apparent to those skilled in the art that various changes and modifications may be made therein without departing from the spirit of the invention or from the scope of the appended claims.

What is claimed is:

1. A back up tire mounted on a rim of a wheel inside a tubeless tire of an automobile, said back up tire comprising a solid annular band of a semi-elastic material surrounding the rim of the wheel upon which the tubeless tire is mounted, the radially outward surface of said band having a semicircular configuration, said rim having a central depression and said band being mounted within said central depression, said band extending radially outwardly beyond the edges of said rim of the wheel with its sidewalls sloping outwardly from said radially outward semicircular surface of the band to the brinks of the depressed portion of the rim, whereby in the event of a blowout that causes the tubeless tire to disintegrate, the back up tire serves as the operating tire on the associated wheel reducing the difficulty of control for the driver while at the same time providing protection for the rim of the wheel as the automobile is brought to a stop for a changing of the tubeless tire, and said back up tire serving as a cushion between the rim of the wheel and the tread of the tubeless tire, thereby minimizing further damage to said tubeless tire as the vehicle is brought to a stop for changing the tubeless tire.

2. The back up tire set forth in claim 1 wherein said semi-elastic band is made of vulcanized rubber that is molded and vulcanized in place upon the rim of the wheel.

3. The back up tire set forth in claim 2 wherein:

said band is strengthened by cords or wires embedded in said vulcanized rubber.

4. The back up tire set forth in claim 1 wherein said band is made of synthetic rubber.

\* \* \* \* \*